United States Patent
Trangbaek et al.

(10) Patent No.: US 12,325,477 B2
(45) Date of Patent: Jun. 10, 2025

(54) VEHICLE CONTROL ADAPTATION TO SUSTAINED WIND LEVELS AND GUSTS

(71) Applicant: GM GLOBAL TECHNOLOGY OPERATIONS LLC, Detroit, MI (US)

(72) Inventors: Klaus Trangbaek, Ein Vered (IL); Mohammadali Shahriari, Markham (CA); Reza Zarringhalam, Whitby (CA); Ashraf Abualfellat, Grand Blanc, MI (US); Vaibhav J. Lawand, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 315 days.

(21) Appl. No.: 18/181,276

(22) Filed: Mar. 9, 2023

(65) Prior Publication Data
US 2024/0300576 A1    Sep. 12, 2024

(51) Int. Cl.
*B62D 6/00*    (2006.01)
*G01P 5/00*    (2006.01)

(52) U.S. Cl.
CPC ............ *B62D 6/008* (2013.01); *G01P 5/00* (2013.01)

(58) Field of Classification Search
None
See application file for complete search history.

(56) References Cited

U.S. PATENT DOCUMENTS

| | | | | |
|---|---|---|---|---|
| 5,315,868 | A * | 5/1994 | Jacobi | G01P 5/14 73/178 R |
| 5,379,218 | A * | 1/1995 | Jacobi | B62D 37/02 296/180.1 |
| 7,536,246 | B2 * | 5/2009 | Cho | B60W 10/18 701/1 |
| 9,694,810 | B2 * | 7/2017 | Keppler | B62D 6/04 |
| 10,479,357 | B2 * | 11/2019 | Hawes | B60R 21/0136 |
| 2010/0004825 | A1 * | 1/2010 | Nakano | B62D 6/008 701/42 |
| 2022/0204083 | A1 * | 6/2022 | Kim | G06T 7/70 |
| 2022/0266852 | A1 * | 8/2022 | Khayyer | B60W 40/08 |
| 2023/0100827 | A1 * | 3/2023 | Zhou | G06N 3/08 701/26 |
| 2023/0391350 | A1 * | 12/2023 | Althoff | B60W 10/04 |

* cited by examiner

*Primary Examiner* — Kurt Philip Liethen
(74) *Attorney, Agent, or Firm* — Quinn IP Law

(57) ABSTRACT

A system and method for a vehicle control adaptation to a crosswind and a wind gust including a controller situated within a vehicle to receive wind data inputs. The wind data inputs are based on a location of the vehicle and include a sustained wind velocity, a sustained wind direction, and a wind gust level. The controller further receives vehicle measurement data from one or more sensors situated within the vehicle and determines a wind impact on the vehicle based on the wind data inputs and the vehicle measurement data. The controller further compensates for the wind impact by a feedforward control in response to a low bandwidth component of the wind data inputs and by a feedback control in response to a high bandwidth component of the wind data inputs. The controller generates a feedback and/or a control based on the wind impact.

20 Claims, 8 Drawing Sheets

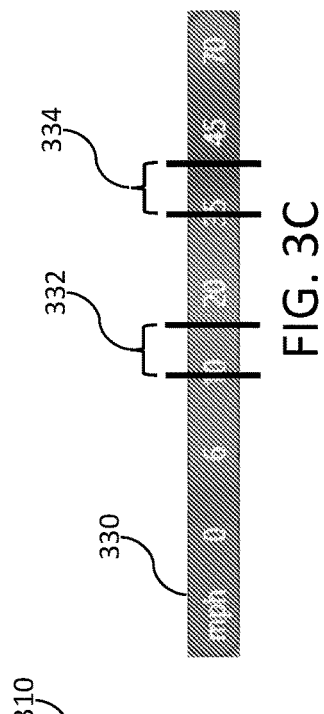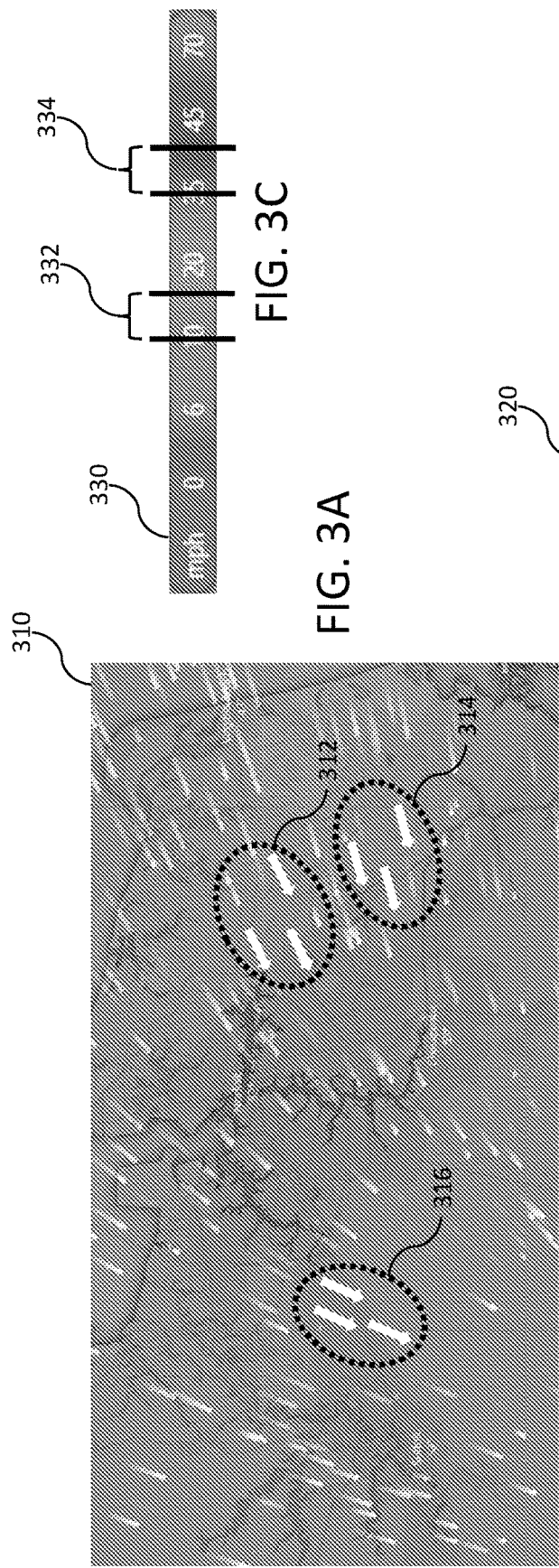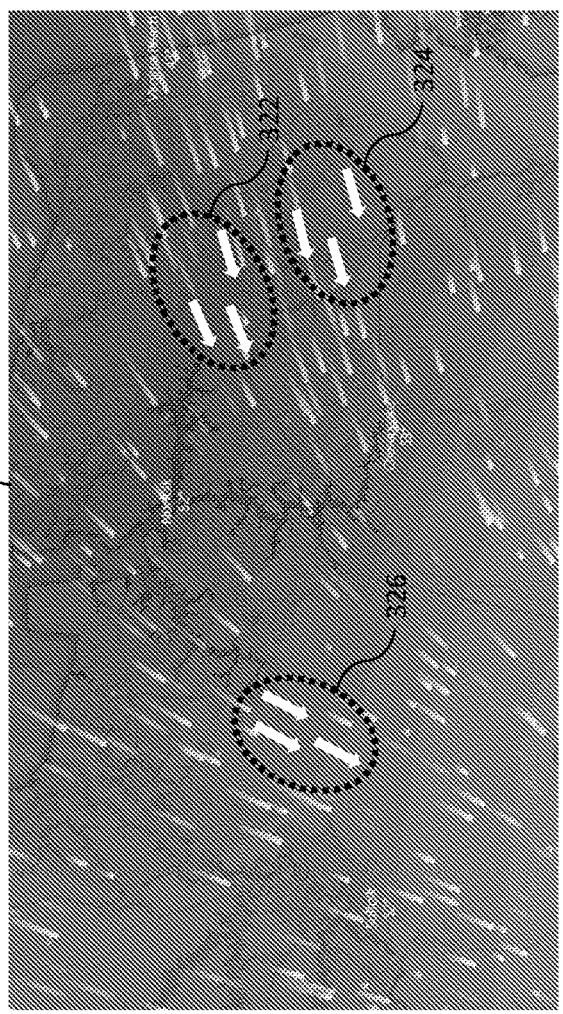
FIG. 3A
FIG. 3B
FIG. 3C

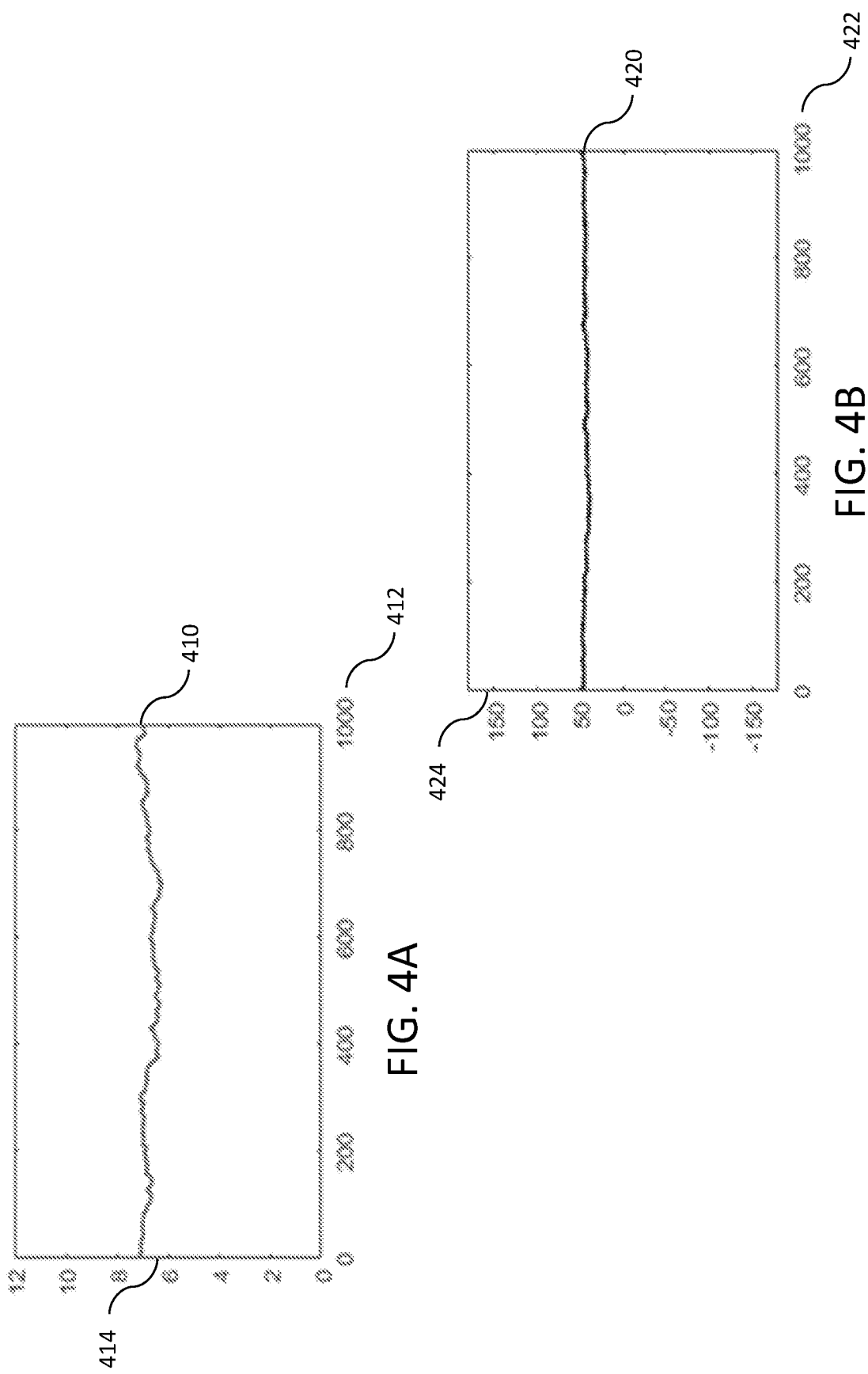

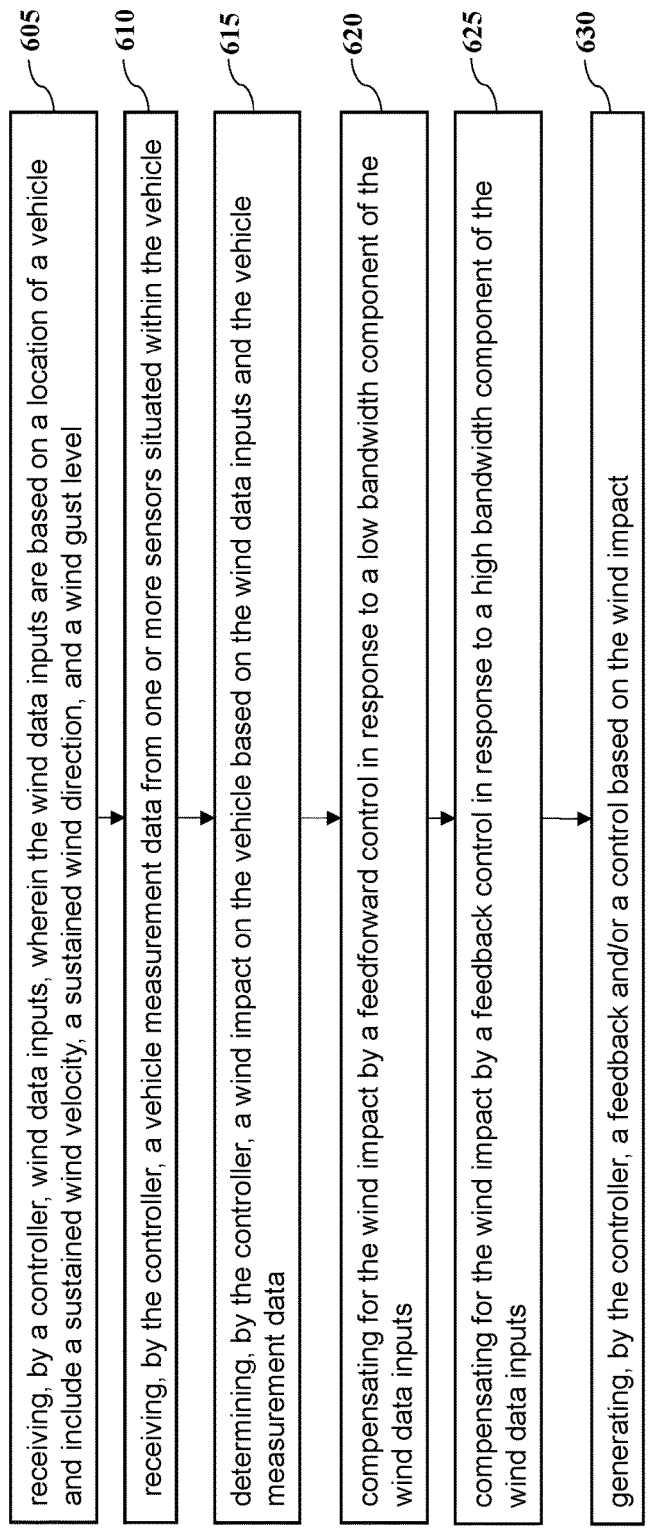

VEHICLE CONTROL ADAPTATION TO SUSTAINED WIND LEVELS AND GUSTS

INTRODUCTION

Vehicles are a staple of everyday life. Special use cameras, microcontrollers, laser technologies, and sensors may be used in many different applications in a vehicle. Cameras, microcontrollers and sensors may be utilized in enhancing automated structures that offer state-of-the-art experience and services to the customers, for example in tasks such as steering and body control, camera vision, information display, security, autonomous controls, etc. Vehicular control systems may also be used to assist in vehicle control including advanced driver assistance systems ("ADAS").

Vehicular control systems may be used to provide the vehicle operator with information of the environment surrounding the vehicle. The control systems may also be used to assist in controlling the vehicle in response to external environmental conditions. For example, the force of a wind gust, depending on the type of vehicle, may produce extreme forces on the vehicle and compromise vehicle control. Sustained wind levels, defined as the wind speed, or wind level, as determined by averaging observed values over a two-minute period by the National Oceanic and Atmospheric Administration ("NOAA"), may reach high levels that are enough to impair vehicle control. Further, wind gusts, defined by the NOAA as rapid fluctuations in the wind speed with a variation of ten knots or more between peaks and lulls, may pose even greater threats, especially given the unpredictability of wind gusts. Accordingly, it is desirable to provide a system and method of vehicle control adaptation to sustained wind levels and gusts.

SUMMARY

Disclosed herein are a system and methods for vehicle control adaptation to a crosswind and a wind gust. As disclosed herein, a system for a vehicle control adaptation to a crosswind and a wind gust includes a controller situated within a vehicle that may receive wind data inputs. The wind data inputs may be based on a location of the vehicle and include a sustained wind velocity, a sustained wind direction, and a wind gust level. The controller may also receive vehicle measurement data from one or more sensors situated within the vehicle. The controller may also determine a wind impact on the vehicle based on the wind data inputs and the vehicle measurement data. Further, the controller may compensate for the wind impact by producing a feedforward control in response to a low bandwidth component of the wind data inputs and by also producing a feedback control in response to a high bandwidth component of the wind data inputs. Then, the controller may generate a feedback and/or a control based on the wind impact.

Another aspect of the disclosure may be a system that includes the wind data inputs originating from an external source.

In another aspect of the disclosure the vehicle measurement may include a velocity of the vehicle, a steering angle of the vehicle, and a yaw rate of the vehicle.

In another aspect of the disclosure the system may include where the feedback and/or control includes a steering torque applied to a steering system of the vehicle.

In another aspect of the disclosure the system may include where the feedback control includes an adjusting of a gain of the feedback to extend a control bandwidth.

In another aspect of the disclosure the system may include a sensor to receive external wind measurement data.

In another aspect of the disclosure the system may include a disturbance quantifier to compare a motion movement of the vehicle to a predicted vehicle motion to determine residual differences reflecting a wind disturbance.

In another aspect of the disclosure the system may include the feedforward control to compensate for a predicted wind force.

In another aspect of the disclosure the system may include the feedback control to optimally suppress a wind gust disturbance.

Another aspect of the disclosure may include where the gain of the feedback is increased to extend the control bandwidth when the wind gust level exceeds a threshold.

Another aspect of the disclosure may include a method for a vehicle control adaptation to a crosswind and a wind gust. The method may include receiving, by a controller, wind data inputs, that the wind data inputs are based on a location of a vehicle and include a sustained wind velocity, a sustained wind direction, and a wind gust level. The method may include receiving, by the controller, vehicle measurement data from one or more sensors situated within the vehicle. The controller may also determine a wind impact on the vehicle based on the wind data inputs and the vehicle measurement data and to compensate for the wind impact by using a feedforward control in response to a low bandwidth component of the wind data inputs and by also using a feedback control in response to a high bandwidth component of the wind data inputs. The method may conclude by generating, by the controller, a feedback and/or a control based on the wind impact.

In another aspect of the method the vehicle measurement data may include a velocity of the vehicle, a steering angle of the vehicle, and a yaw rate of the vehicle.

In another aspect of the method the feedback and/or control may include a steering torque applied to a steering system of the vehicle.

In another aspect of the method the feedback control may include an adjusting of a gain of the feedback to extend a control bandwidth.

In another aspect of the method the controller may determine the wind impact based on an external wind measurement data from a vehicle sensor.

In another aspect of the method a motion movement of the vehicle may be compared to a predicted vehicle motion to determine residual differences reflecting a wind disturbance.

In another aspect of the method the feedforward control may include compensating by the feedforward control a predicted wind force.

In another aspect of the method the feedback control may include compensating for a predicted wind gust level.

In another aspect of the method the gain of the feedback may be increased to extend the control bandwidth when the wind gust level exceeds a threshold.

Another aspect of the disclosure may include a method of vehicle control adaptation to a crosswind and a wind gust including receiving, by a controller, wind data inputs, such that the wind data inputs are based on a location of a vehicle and include a sustained wind velocity, a sustained wind direction, and a wind gust level. The method may continue by receiving, by the controller, vehicle measurement data from one or more sensors situated within the vehicle, where the vehicle measurement data includes a velocity of the vehicle, a steering angle of the vehicle, and a yaw rate of the vehicle. The method may also include determining, by the controller, a wind impact on the vehicle based on the wind data inputs, the vehicle measurement data, and external wind measurement data from a vehicle sensor. The method may also include compensating for the wind impact by generating a feedforward control in response to a low bandwidth component of the wind data inputs and also by generating a feedback control in response to a high bandwidth component of the wind inputs. Further, the method may include generating, by the controller, a feedback and/or a control based on the wind impact, where the feedback control includes an adjusting of a gain of the feedback to extend a control bandwidth and then comparing a motion movement of the vehicle to a predicted vehicle motion to determine residual differences reflecting a wind disturbance. The method may also include compensating, by the feedforward control, for a predicted wind force and also compensating, by the feedback control, for a predicted wind gust level and increasing the gain of the feedback to extend the control bandwidth when the wind gust level exceeds a threshold.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIGS. 3A, 3B, and 3C are illustrations of wind and gust direction vectors, in accordance with the disclosure.

FIGS. 4A and 4B are an illustration of a crosswind decomposed into a sustained wind component velocity and direction, in accordance with the disclosure.

FIG. 6 depicts a flowchart of a method for vehicle control adaptation to sustained wind and gusts, in accordance with the disclosure.

Figure 1:
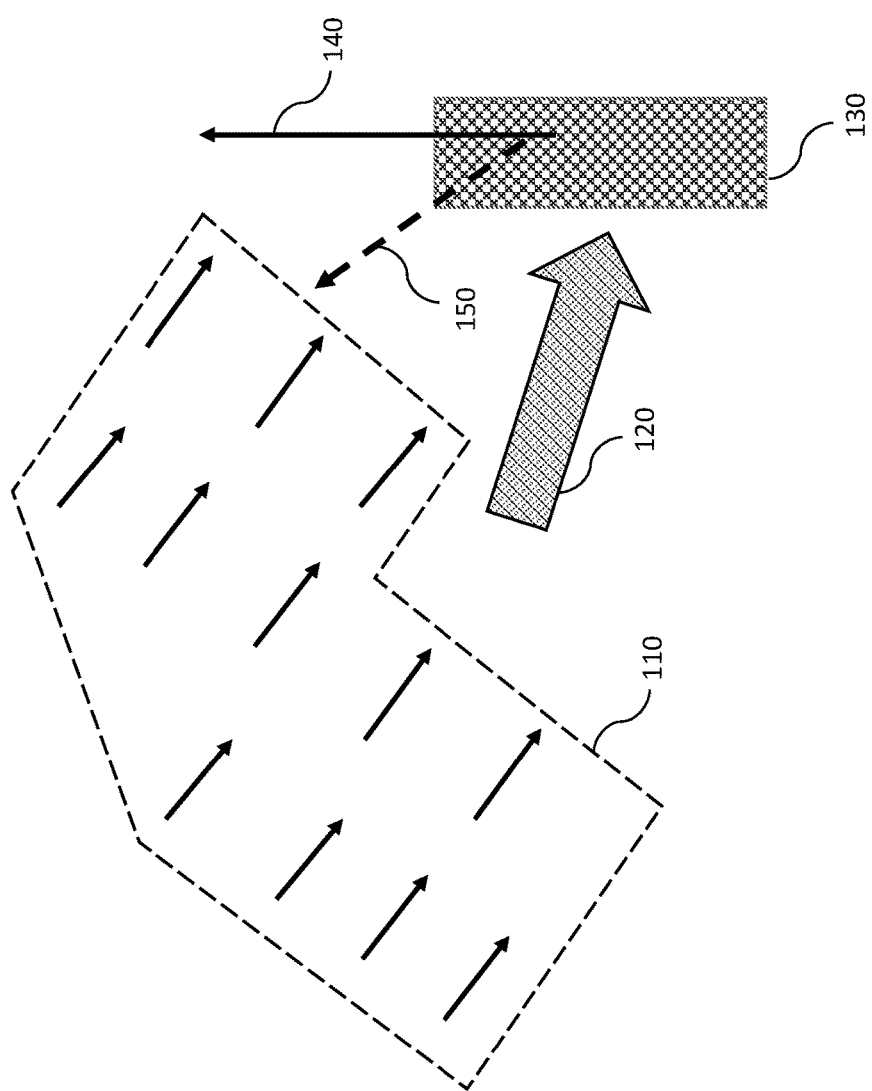
FIG. 1 is an illustration of crosswind forces on a vehicle, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles.

To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from sensors on a vehicle.

Further, during roadway operation of a vehicle by a vehicle operator, semi-autonomously or fully autonomous, the vehicle may encounter environmental challenges including changing weather conditions. Sensitivity to weather conditions pose a problem for the self-driving experience. Weather conditions, including crosswinds may present challenges to vehicle operation and control and thus the use of crosswind detection and mitigation may be used to compensate for such conditions.

FIG. 1 is an illustration of crosswind forces scenario 100 on a vehicle, according to an embodiment of the present disclosure. Scenario 100 includes wind vectors 110, a composite wind force 120, and a vehicle 130. Wind vectors 110 are an illustration of a direction of the wind and a velocity of the wind. Further, wind vectors 110 may include two components of wind. A first component may consist of a sustained wind value while a second component may consist of a gust wind level. The sustained wind value is typically predictable and observable while the gust wind level component may be hard to predict or observe.

The result of the force of the wind vectors 110 may be illustrated as the composite wind force 120 that illustrates a total force and a direction of the wind on the vehicle 130. Vehicle 130 is illustrated as traveling along a direction and velocity vector 140. However, given the wind force 120, which may also be referred to as a wind impact, results in a torque to alter the direction of travel of the vehicle 130 along the direction of vector 150. Depending upon the characteristics of the vehicle 130 and the direction of velocity of the wind vectors 110, a sudden wind impact upon vehicle 130 may result in a very undesirable change in direction of travel. To mitigate such effects, the present disclosure presents a multi-factor compensation approach directed to a high bandwidth component and a low bandwidth component of the crosswind.

Figure 2A:
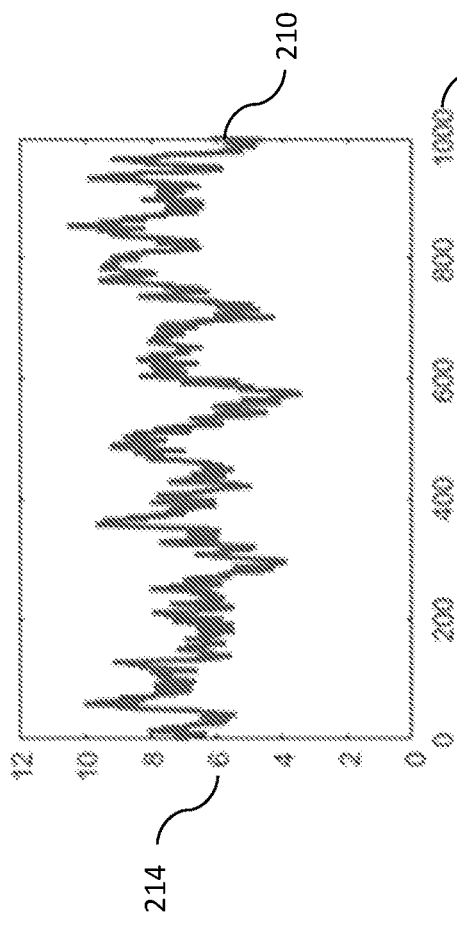
FIGS. 2A and 2B are an illustration of a crosswind speed and direction over time, in accordance with the disclosure.
Figure 2B:
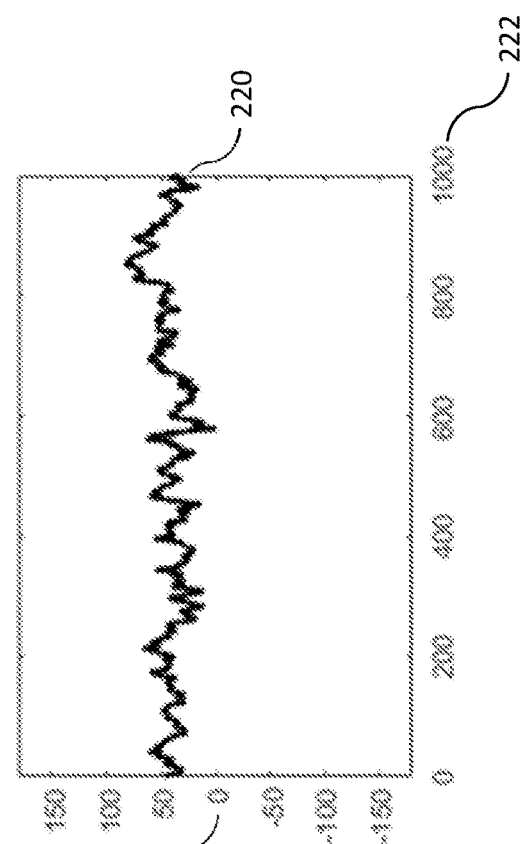

FIGS. 2A and 2B are an illustration of a crosswind speed and direction over time, according to an embodiment of the present disclosure. FIG. 2A represents a wind velocity component plotted over time that may include a wind velocity 210 with a vertical axis 214 indicating a velocity of the wind and a horizontal axis 212 indicating time. FIG. 2B represents a directional component of the wind plotted over time that may include a wind direction 220 with a vertical axis 224 indicating the directional degrees of wind impact on the vehicle and a horizontal axis 222 indicating time. The directional degrees of wind impact may be shown as the direction of the wind impact in relationship to the position of the vehicle. For example, the direction of travel may be shown to be at zero degrees where, in this example, the general direction of the wind impact is at fifty degrees offset from the direction of travel. This example of directional coordinates is for illustrative purposes and other methods of spatial coordinates may be used.

The data shown in FIGS. 2A and 2B may be obtained by sensors on board a vehicle, e.g., vehicle 130, or by third party providers such as illustrated by Windy.com as will be shown in FIGS. 3A, 3B, and 3C. Further, the data shown in FIGS. 2A and 2B may also be predicted future values based on historical data collected by sensors on board a vehicle or through third party providers.

FIGS. 3A, 3B, and 3C are illustrations of a wind speed and direction, gust speed and direction, and an associated speed index, according to an embodiment of the present disclosure. Specifically, FIG. 3A illustrates a wind vector scenario 310 containing wind vectors such as the highlighted wind vectors 312, wind vectors 314, and wind vectors 316. The randomly selected highlighted vectors are just examples showing different directions of wind within the mapped area. The wind vectors 312, wind vectors 314, and wind vectors 316 also indicate a sustained wind velocity of approximately 10 to 15 miles per hour as shown by range 332 on the index 330 in FIG. 3C. Further, the data illustrated by FIG. 3A and FIG. 3B represent an area of wind activity that may be provided by a third party entity or by multiple vehicles capturing wind and gust data through onboard vehicle sensors.

Further, FIG. 3B illustrates a gust vector scenario 320 containing gust vectors such as the highlighted gust vectors 322, gust vectors 324, and gust vectors 326. The gust vectors 322, gust vectors 324, and gust vectors 326 also indicate a gust velocity of approximately 35 to 40 miles per hour as shown by range 334 on the index 330 in FIG. 3C. While the gust vectors in FIG. 3B may typically be in a similar direction as the wind vectors in FIG. 3A, they are not necessarily identical and in some situations may be significantly different as will be discussed in FIGS. 4C and 4D.

Figure 4D:
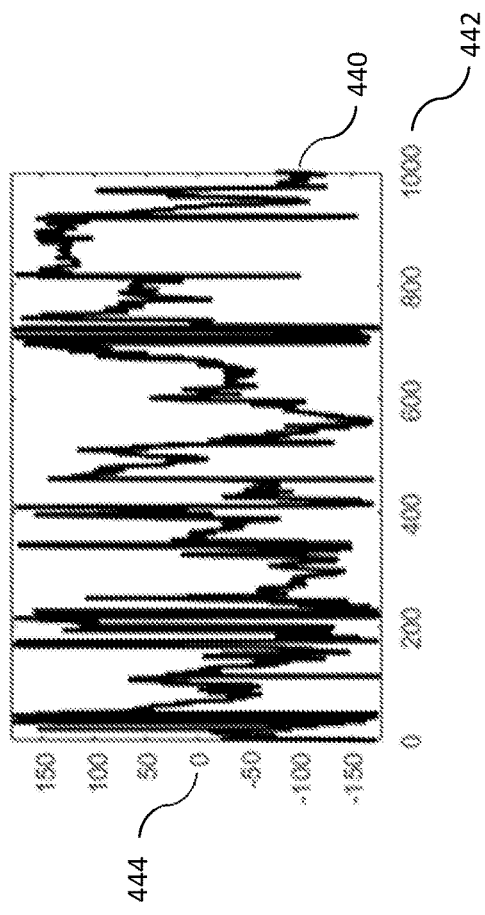
FIGS. 4C and 4D are an illustration of a crosswind decomposed into a gust component velocity and direction, in accordance with the disclosure.
Figure 4C:
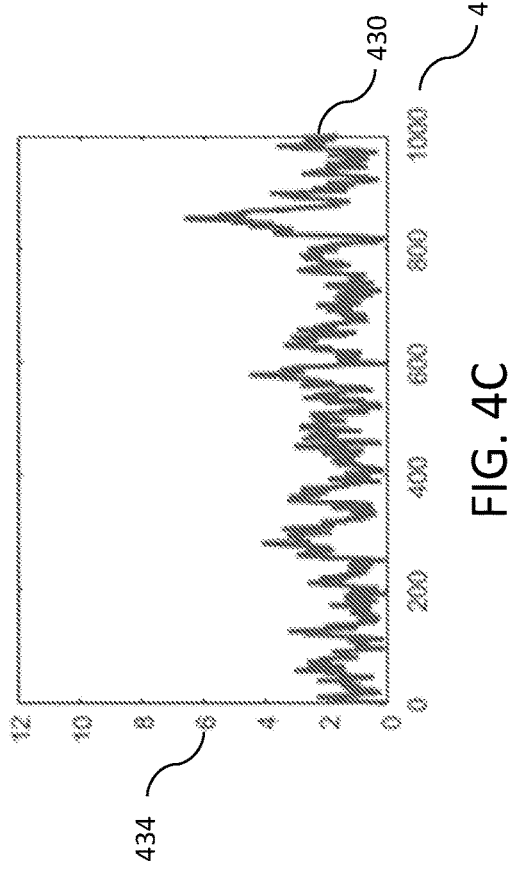

As illustrated in FIG. 2, crosswinds may contain significant variations in velocity and direction. Crosswinds may be decomposed and broken down into two different components. FIGS. 4A and 4B illustrate a sustained wind component, while FIGS. 4C and 4D illustrate a wind gust, or gust, component. FIG. 4A illustrates a sustained wind component 410 plotted on a graph with a vertical axis 414 indicating a velocity of the sustained wind component and a horizontal axis 412 indicating time. FIG. 4B illustrates a direction of the sustained wind component 420 plotted on a graph with a vertical axis 424 indicating a direction of the sustained wind component and a horizontal axis 422 indicating time. Of note in FIG. 4A and FIG. 4B is the lack of large fluctuations in either velocity or direction. The sustained wind levels and directions are predictable and observable. As will be discussed in FIG. 5A and FIG. 5B, the sustained wind component may be used in a feedforward compensation or integral action in a vehicle control system to compensate for the effects of the sustained wind component of a crosswind.

In comparison, FIGS. 4C and 4D illustrate the gust component of a crosswind. For example, FIG. 4C illustrates a gust wind component 430 plotted on a graph with a vertical axis 434 indicating a velocity of the gust wind component and a horizontal axis 432 indicating time. FIG. 4D illustrates a direction of the gust wind component 440 plotted on a graph with a vertical axis 444 indicating a direction of the gust wind component and a horizontal axis 442 indicating time. While FIG. 4A illustrated a sustained wind component with a variation in velocity of approximately ±1 MPH and FIG. 4B illustrated a variation in direction of approximately ±10 degrees, FIGS. 4C and 4D represent an extremely different scenario. For example, FIG. 4C illustrates a gust wind component with a variation in velocity of up to approximately 6 MPH with FIG. 4D illustrating a variation in the direction of the wind gust up to 360 degrees. Wind gusts, such as shown in FIGS. 4C and 4D represent a high bandwidth component that may be difficult to predict or observe. Further, as stated previously, the data represented in FIGS. 4A, 4B, 4C, and 4D, may be obtained from independent data sources or actual observed data points. Such gust wind data may be used to adjust a controller's bandwidth and to compensate for the effects of such crosswinds.

In an embodiment, as discussed above, wind conditions are separated into high and low bandwidth components, where wind gusts may be classified as the high bandwidth component and where sustained winds may be classified as the low bandwidth component. The effects of the high bandwidth components on a vehicle may be compensated by adjusting the control bandwidth using feedback to a controller as will be shown in FIG. 5A and FIG. 5B. Similarly, the effects of the low bandwidth components on a vehicle may be compensated by a feedforward control, also referred to as passing a controlling signal from a source in the external environment to a load and not error based as may be the case in a feedback system that adjusts an input to account for the effects on a load. The use of feedback and feedforward controls allows for an adaptation to effectively resist crosswind impact effects on a vehicle.

Figure 5A:
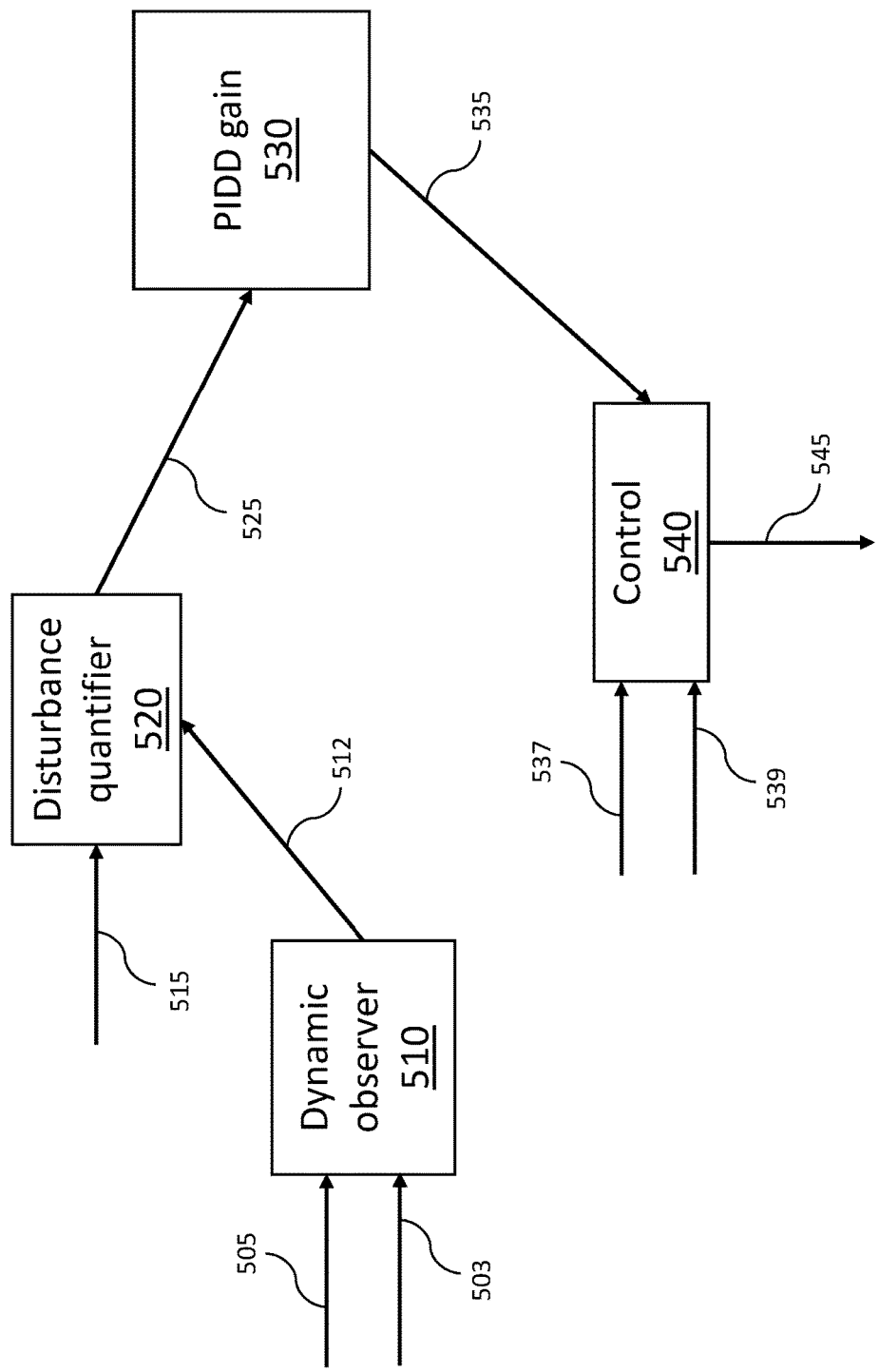
FIGS. 5A and 5B are block diagrams of a control structure using proportional integral double derivative module (FIG. 5A) and model based (FIG. 5B) for a vehicle control adaptation to sustained wind and gusts, in accordance with the disclosure.

FIG. 5A is a block diagram of a control structure 500 for a vehicle control adaptation to sustained wind and gusts using a proportional integral double derivative module, according to an embodiment of the present disclosure. Control structure may be located within a vehicle and designed to compensate for the effects of crosswinds, also referred to as a wind impact or wind impact event. Control structure 500 may also include a dynamic observer 510, a disturbance quantifier 520, a proportional integral double derivative module (PIDD) 530 and a control circuit 540.

Control structure 500 may accept as inputs to the dynamic observer 510 vehicle measurements 505 and external measurements 503 that includes weather data. In general vehicle measurements may include at least the following factors:

Vx Vehicle velocity;
Ψ Y Vehicle yaw;
Ψ̇ Vehicle yaw rate;
y Lateral position;
ŷ Lateral velocity;
δ Steering angle;
A Vehicle dynamics matrix
B Vehicle dynamics steering input vector; and
$B_w$ Vehicle dynamics wind input vector.

In the PIDD embodiment shown in FIG. 5A, the vehicle measurements 505 may include Vx—Vehicle velocity, Ψ̇—Vehicle yaw rate, y—Lateral position, and δ—Steering angle.

External measurements 503 may include weather data that may include at least W Wind speed and $W_G$ Wind Gust speed. In addition, based on the vehicle measurements 505 and external measurements 503, the dynamic observer 510 may generate the following:

Ŵ Predicted wind speed;
$θ_W$ Aero angle of attack, function of wind direction, vehicle yaw and velocity;
$θ_W$ Predicted aero angle of attack based on sustained wind direction; and
$Ŵ_G$ Predicted gust intensity/speed.

Dynamic observer 510 may also, based on its predictions and actual measurements generate a set of residuals 512 that represents the difference between the predicted and actual values reflecting the effects of a wind disturbance. Residuals 512 may be forwarded to the disturbance quantifier 520 that may execute a covariance function on the residuals as compared to the external measurements 515, the weather data, to generate a disturbance covariance estimate 525 that may include Ŵ—Predicted wind speed, $θ_W$—Predicted aero angle of attack based on sustained wind direction, and $Ŵ_G$—Predicted gust intensity/speed.

The PIDD 530 gain may be designed to generate a PIDD 535 where the derivative of the state of the vehicle is shown as follows:

$$ė = A(Vx)e + B(Vx)δ + Bw(θw)W \quad \text{Control model:}$$
$$ė = A(Vx)e + B(Vx)δ + Bw(θw)W$$

Control circuit 540 may then be based on the vehicle measurements 537 that may include Vx-Vehicle velocity, Ψ̇-Vehicle yaw rate, y-Lateral position and the external measurements 539, the weather data to generate a control signal 545, δ-Steering angle that may be based on the following:

State vector:$e=[e_Ψ,e_{\dot{Ψ}},e_y,e_δ]$

Controller: $δ = K(V_x, θ_W, Ŵ_G)e + f(θ_W)Ŵ$

Figure 5B:
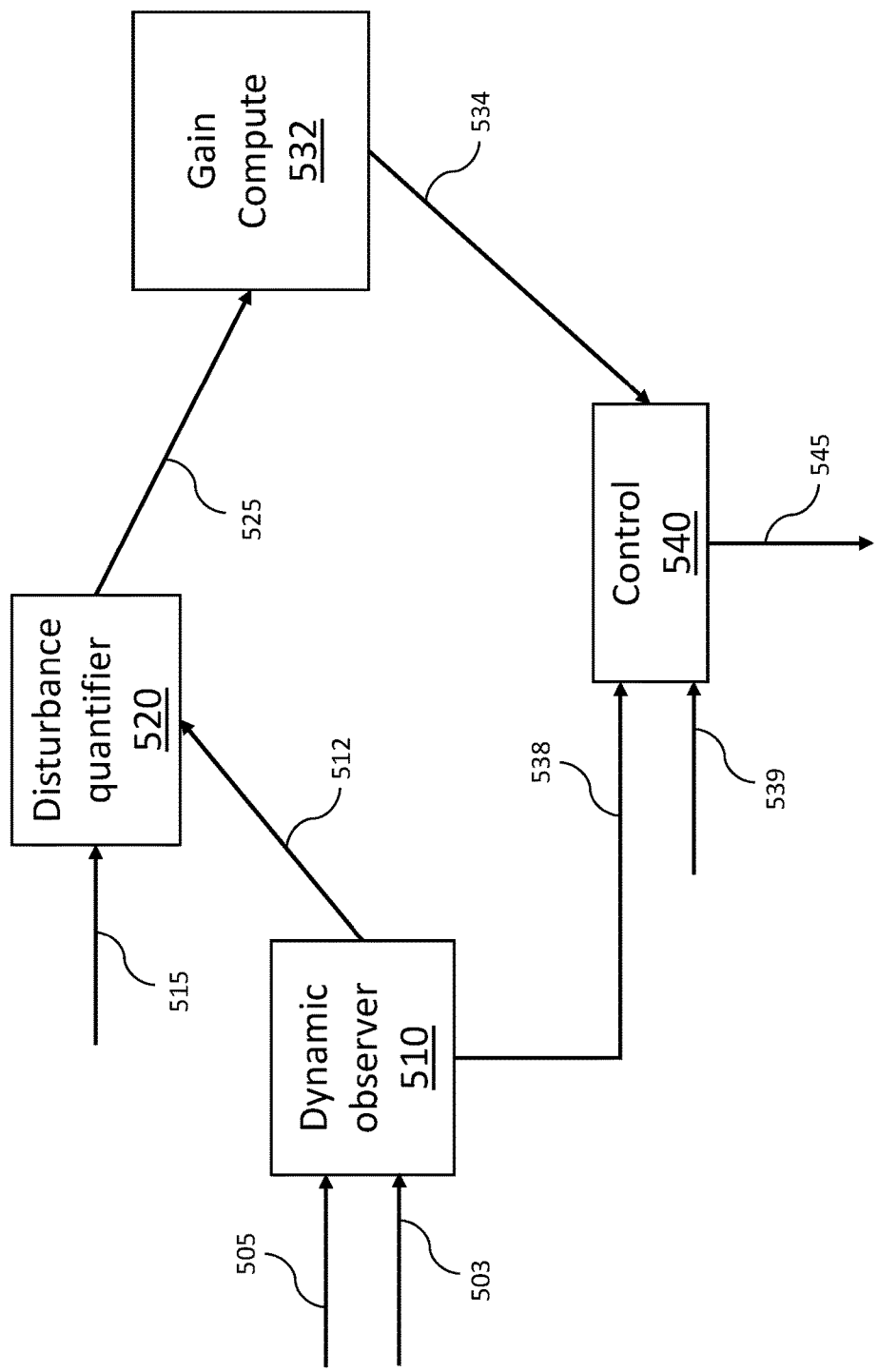

FIG. 5B is a block diagram of a control structure 500' for a vehicle control adaptation to sustained wind and gusts using a model-based approach, according to an embodiment of the present disclosure. Control structure may be located within a vehicle and designed to compensate for the effects of crosswinds, also referred to as a wind impact or wind impact event. Control structure 500' may also include a dynamic observer 510, a disturbance quantifier 520, a gain compute module 532 and a control circuit 540.

Control structure 500' may accept as inputs to the dynamic observer 510 vehicle measurements 505 and external measurements 503 that includes weather data. In general, vehicle measurements may include at least the following factors:

Vx Vehicle velocity;
Ψ Vehicle yaw;
Ψ̇ Vehicle yaw rate;
y Lateral position;
ŷ Lateral velocity;
δ Steering angle;
A Vehicle dynamics matrix
B Vehicle dynamics steering input vector; and
$B_w$ Vehicle dynamics wind input vector.

In the model-based embodiment shown in FIG. 5B, the vehicle measurements 505 may include Vx—Vehicle velocity, Ψ̇—Vehicle yaw rate, y—Lateral position, and δ—Steering angle.

External measurements 503 may include weather data that may include at least W Wind speed and $W_G$ Wind Gust speed. In addition, based on the vehicle measurements 505 and external measurements 503, the dynamic observer 510 may generate the following:

Ŵ Predicted wind speed;
$θ_W$ Aero angle of attack, function of wind direction, vehicle yaw and velocity;
$θ_W$ Predicted aero angle of attack based on sustained wind direction; and
$W_G$ Predicted gust intensity/speed.

Dynamic observer 510 may also, based on its predictions and actual measurements generate a set of residuals 512 that represents the difference between the predicted and actual values reflecting the effects of a wind disturbance. Residuals 512 may be forwarded to the disturbance quantifier 520 that may execute a covariance function on the residuals as compared to the external measurements 515, the weather data, to generate a disturbance covariance estimate 525 that may include Ŵ—Predicted wind speed, $θ_W$—Predicted aero angle of attack based on sustained wind direction, and $Ŵ_G$—Predicted gust intensity/speed.

The gain compute module 532 may be designed to generate K, a feedback gain where the derivative of the state of the vehicle is shown as follows:

$$ė = A(Vx)e + B(Vx)δ + Bw(θw)W \quad \text{Control model:}$$
$$ė = A(Vx)e + B(Vx)δ + Bw(θw)W$$

Control circuit 540 may then be based on a predicted state 538 of the vehicle, ê, and external measurements 539, the weather data to generate a control signal 545, δ—Steering angle that may be based on the following:

State vector:$e=[e_Ψ,e_{\dot{Ψ}},e_y,e_δ]$

Controller: $δ = K(V_x, θ_W, Ŵ_G)e + f(θ_W)Ŵ$

The feedforward gain f ($\theta_W$) may be designed to compensate for the predicted sustained winds. In addition, the state feedback gain K may be computed to optimally suppress wind gust disturbances. In addition, when the gust intensity increases, the feedback gain may also be increased to extend the control bandwidth, thereby suppressing disturbances and the effects of wind impacts.

Further, vehicles may be equipped with additional steering actuators, such as active rear steer/torque vectoring or warp steering where improved performance of a self-steering controller and also provide disturbance rejection in manual steering situations that may be obtained by using the above approach by redefining the δ steering angle as a vector with front and rear steer as follows:

$$\delta = \begin{bmatrix} \delta_f \\ \delta_r \end{bmatrix}$$

Control signal 545 may also be used in conjunction with vehicle systems such as lane keeping where the driver may or may not have their hand on the steering wheel where a warning may be given when control is in a gusty control mode. Further, when the driver has their hands on the steering wheel in the case of approaching a lane departure, steering torque may be applied where in gusty conditions a threshold for activating a lane keep assist function may be lowered and a warning may be generated.

FIG. 6 is an illustration of vehicle control adaptation to a crosswind and a wind gust method 600, according to an embodiment of the present disclosure. Step 605 may include receiving, by a controller, wind data inputs, wherein the wind data inputs are based on a location of a vehicle and include a sustained wind velocity, a sustained wind direction, and a wind gust level. As discussed in FIGS. 4A, 4B, 4C, and 4D, wind may consist of two different components that include a sustained wind component and a wind gust component. The sustained wind component as shown in FIGS. 4A and 4B may be thought of as predictable and observable with a fairly consistent velocity and direction at a given point in time. In contrast, the wind gust component is hard to predict or observe, contains a high bandwidth component and possibly a very erratic set of directions as shown in FIGS. 4C and 4D.

Further, as shown in FIGS. 3A and 3B, the strength and direction of sustained wind and wind gusts may vary based on location. For example, the sustained wind direction in FIG. 3A cast of Norfolk is shown to be blowing in a northeast direction while just west of Norfolk the wind is shown to be blowing in a south by southwest direction.

Step 610 may include receiving, by the controller, a vehicle measurement data from one or more sensors situated within the vehicle. As discussed regarding FIG. 5, control structure 500 may accept as inputs vehicle measurements 505 and external measurements 503. Vehicle measurements may include a velocity of the vehicle, a yaw measurement, a yaw rate, a lateral position, a lateral velocity, and a steering angle. Given the shape and dynamics of a vehicle, which may be different from vehicle to vehicle. For example, the wind resistance of a box truck may be vastly different than that of a low-slung sports vehicle. Thus, the vehicle may be associated with one or more attributes that may be characterized by a vehicle dynamics matrix, a vehicle dynamics steering input vector, and a vehicle dynamics wind input vector. Such attributes, combined with other vehicle measurement data may model the effects of a wind impact on the vehicle.

Step 615 may include determining, by the controller, a wind impact on the vehicle based on the wind data inputs and the vehicle measurement data. As discussed in step 610, a vehicle may be characterized by one or more dynamics matrixes or vectors, that may predict the results of a wind impact on the vehicle, for example the box truck example may be highly susceptible to a crosswind impact that may affect the drivability of the vehicle and thus may require some amount of steering assistance or other corrective action including some type of warning to the driver.

Step 620 may include compensating for the wind impact by a feedforward control in response to a low bandwidth component of the wind data inputs. As discussed in FIG. 4, wind may be modeled as two components, a low bandwidth sustained wind component and a high bandwidth gust wind component. As the sustained wind component is predictable and observable a feedforward compensation or integral action may be used to compensate for the sustained wind component.

Step 625 may include compensating for the wind impact by a feedback control in response to a high bandwidth component of the wind data inputs. Wind gusts typically include high bandwidth components that are hard to predict or observe as illustrated in FIGS. 4C and 4D with erratic wind gusts, both in velocity and direction.

Step 630 may include generating, by the controller, a feedback and/or a control based on the wind impact. As discussed in FIG. 5, control signal 545 may be generated and used in conjunction with vehicle systems such a lane keeping where the driver may or may not have their hand on the steering wheel where a warning may be given when control is in a gusty control mode. In an embodiment, control signal 545 may produce a steering torque that may be applied where in gusty conditions a threshold for activating a lane keep assist function may be lowered and a warning may be generated.

Method 600 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for vehicle control adaptation to a crosswind and a wind gust, the system comprising:
   a controller situated within a vehicle and configured to receive wind data inputs, wherein the wind data inputs are based on a location of the vehicle and include a sustained wind velocity, a sustained wind direction, and a wind gust level;
   one or more sensors situated within the vehicle; and
   a lane keeping system including one or more steering actuators situated within the vehicle;
   the controller further configured to:
      receive vehicle measurement data from the one or more sensors situated within the vehicle;
      determine a wind impact on the vehicle based on the wind data inputs and the vehicle measurement data; and
      compensate for the wind impact by:
         generating a feedforward gain to compensate for a low bandwidth component of the wind data inputs, wherein the low bandwidth component includes at least one of the sustained wind velocity or the sustained wind direction;
         generating a feedback gain to compensate for a high bandwidth component of the wind data inputs, wherein the high bandwidth component includes at least one of the wind gust level or a wind gust direction; and
         generating, using the feedforward gain and the feedback gain, a control signal to compensate for the wind impact, wherein the control signal is configured to adjust a steering torque from the one or more steering actuators.

2. The system of claim 1, wherein the wind data inputs originate from an external source.

3. The system of claim 1, wherein the vehicle measurement data comprise a velocity of the vehicle, a steering angle of the vehicle, and a yaw rate of the vehicle.

4. The system of claim 1, wherein the one or more steering actuators are configured to apply the steering torque to a steering system of the vehicle in response to the control signal.

5. The system of claim 1, wherein the controller is configured to adjust the feedback gain to extend a control bandwidth.

6. The system of claim 1, further comprising a sensor configured to receive external wind measurement data.

7. The system of claim 1, further comprising a disturbance quantifier configured to compare a motion movement of the vehicle to a predicted vehicle motion to determine residual differences reflecting a wind disturbance.

8. The system of claim 1, wherein the feedforward gain is configured to compensate for a predicted wind force.

9. The system of claim 1, wherein the feedback gain is configured to optimally suppress a wind gust disturbance.

10. The system of claim 5, wherein the feedback gain is increased to extend the control bandwidth when the wind gust level exceeds a threshold.

11. A method for vehicle control adaptation to a crosswind and a wind gust, the method comprising:
   receiving, by a controller situated within a vehicle, wind data inputs, wherein the wind data inputs are based on a location of the vehicle and include a wind velocity and a wind direction;
   decomposing, by the controller, the wind data inputs into low bandwidth components and high bandwidth components, wherein the low bandwidth components include a sustained wind velocity and a sustained wind direction, wherein the high bandwidth components include a wind gust velocity and a wind gust direction,
   receiving, by the controller, vehicle measurement data from one or more sensors situated within the vehicle;
   determining, by the controller, a wind impact on the vehicle based on the wind data inputs and the vehicle measurement data; and
   compensating for the wind impact by:
      generating a feedforward gain to compensate for at least one of the low bandwidth components of the wind data inputs;
      generating a feedback gain to compensate for at least one of the high bandwidth components of the wind data inputs; and
      generating, by the controller, a control signal based on the feedforward gain and the feedback gain, wherein the control signal is configured to adjust a steering torque from one or more steering actuators situated within the vehicle.

12. The method of claim 11, wherein the vehicle measurement data comprises a velocity of the vehicle, a steering angle of the vehicle, and a yaw rate of the vehicle.

13. The method of claim 11, wherein the one or more steering actuators are configured to apply the steering torque to a steering system of the vehicle in response to the control signal.

14. The method of claim 11, further comprising adjusting the feedback gain to extend a control bandwidth.

15. The method of claim 11, further comprising determining, by the controller, the wind impact based on external wind measurement data from a vehicle sensor.

16. The method of claim 11, further comprising comparing a motion movement of the vehicle to a predicted vehicle motion to determine residual differences reflecting a wind disturbance.

17. The method of claim 11, further comprising adjusting the feedforward gain to compensate for a predicted wind force.

18. The method of claim 11, further comprising adjusting the feedback gain to compensate for a predicted wind gust level.

19. The method of claim 14, further comprising increasing the feedback gain to extend the control bandwidth when the wind data inputs include a wind gust level that exceeds a threshold.

20. A method for vehicle control adaptation to a crosswind and a wind gust, the method comprising:
   receiving, by a controller, wind data inputs, wherein the wind data inputs are based on a location of a vehicle in which the controller is situated, and wherein the wind data inputs include a sustained wind velocity, a sustained wind direction, and a wind gust level;
   receiving, by the controller, vehicle measurement data from one or more sensors situated within the vehicle, wherein the vehicle measurement data comprises a velocity of the vehicle, a steering angle of the vehicle, and a yaw rate of the vehicle;

determining, by the controller, a wind impact on the vehicle based on the wind data inputs, the vehicle measurement data, and external wind measurement data from a vehicle sensor;

compensating for the wind impact by:
- generating a feedforward gain to compensate for a low bandwidth component of the wind data inputs, wherein the low bandwidth component includes at least one of the sustained wind velocity or the sustained direction;
- generating a feedback gain to compensate for a high bandwidth component of the wind data inputs, wherein the high bandwidth component includes at least one of the wind gust level or a wind gust direction; and
- generating, by the controller, a control signal based on the feedforward gain and the feedback gain, wherein the control signal is configured to adjust a steering torque from one or more steering actuators situated within the vehicle;

comparing a motion movement of the vehicle to a predicted vehicle motion to determine residual differences reflecting a wind disturbance;

adjusting the feedforward gain to compensate for a predicted wind force;

adjusting the feedback gain to compensate for a predicted wind gust level; and increasing the feedback gain to extend a control bandwidth when the wind gust level exceeds a threshold.

* * * * *